(12) United States Patent
Gu et al.

(10) Patent No.: US 6,874,086 B1
(45) Date of Patent: Mar. 29, 2005

(54) METHOD AND APPARATUS IMPLEMENTED IN A FIREWALL FOR COMMUNICATING INFORMATION BETWEEN PROGRAMS EMPLOYING DIFFERENT PROTOCOLS

(75) Inventors: Ke-Qin Gu, San Jose, CA (US); Tsung-Yen (Eric) Chen, Fremont, CA (US); Ching-Chih (Jason) Han, Fremont, CA (US); Kuo-Chun Lee, Fremont, CA (US)

(73) Assignee: Oridus, Inc., Fremont, CA (US)

( * ) Notice: Subject to any disclaimer, the term of this patent is extended or adjusted under 35 U.S.C. 154(b) by 960 days.

(21) Appl. No.: 09/636,135

(22) Filed: Aug. 10, 2000

(51) Int. Cl.⁷ .................................................. G06F 1/24
(52) U.S. Cl. ....................... 713/168; 713/151; 713/161; 713/166
(58) Field of Search .................. 713/168, 151, 713/161, 166

(56) References Cited

U.S. PATENT DOCUMENTS 5,987,517 A * 11/1999 Firth et al. ................. 709/230
5,996,076 A * 11/1999 Rowney et al. ............. 713/201
6,006,258 A * 12/1999 Kalajan ...................... 709/219

* cited by examiner

*Primary Examiner*—Thomas R. Peeso
(74) *Attorney, Agent, or Firm*—Victor H. Okumoto

(57) ABSTRACT

A computer system includes a web client having a client based program residing on it, a firewall having a protocol proxy residing on it, and a host server having an application program and a special window manager residing on it. All communications between the protocol proxy and the application program go through the special window manager. The web client communicates with the firewall through the Internet, and the firewall communicates with the host server through a LAN. The client based program employs HTTP, and the special window manager employs a persistent connection, socket-based protocol. The protocol proxy establishes and maintains a persistent connection with the special window manager, and communicates information back and forth between the client based program and the application program through the special window manager by first protocol translating the information between HTTP and the special window manager's persistent connection, socket-based protocol.

18 Claims, 3 Drawing Sheets

US 6,874,086 B1

METHOD AND APPARATUS IMPLEMENTED IN A FIREWALL FOR COMMUNICATING INFORMATION BETWEEN PROGRAMS EMPLOYING DIFFERENT PROTOCOLS

FIELD OF THE INVENTION

The present invention generally relates to methods and apparatuses for communicating information between programs and in particular, to a method and apparatus implemented in a firewall for communicating information between programs employing different protocols.

BACKGROUND OF THE INVENTION

In many applications it is useful for programs to communicate information to each other. When the programs employ different protocols, however, such communication cannot occur directly. Protocol translation of the information is first necessary in order for a program to correctly interpret the information transmitted by another program employing a different protocol.

One such application involves communications over the Internet. With the growing popularity of the Internet, there is a growing demand by certain users to drive tools through the Internet, instead of only browsing the Internet. In particular, these users desire to access and use remotely located, real-time interactive software through the Internet. In many cases, this kind of activity requires a persistent connection using a socket-based protocol, since such real-time interactive software were generally developed to run over a local area network ("LAN").

On the other hand, the HyperText Transfer Protocol ("HTTP") is the pervasive protocol of the World Wide Web. HTTP is a stateless protocol, because each command is executed independently, without knowledge of the commands that came before it. HTTP uses a request-response mechanism that is suitable for web browsing. HTTP, however, is different than many socket-based protocols in both format and handling procedure, thus making HTTP less than ideal for directly driving another program over the Internet.

Firewalls add further complications since they generally prevent direct and persistent connections to programs behind the firewall. Therefore, even though firewalls support HTTP communications through the Internet, driving an interactive real-time program behind a firewall is not straightforward. Modifying the interactive real-time programs to accommodate such communication is also generally impractical, because of the large number and complexity of such legacy programs.

OBJECTS AND SUMMARY OF THE INVENTION

Accordingly, it is an object of the present invention to provide a method and apparatus for communicating information between programs employing different protocols.

Another object is to provide a method and apparatus for communicating information over the Internet and through a firewall between programs employing different protocols.

Still another object is to provide a method and apparatus for communicating information over the Internet and through a firewall to a program requiring a persistent connection behind the firewall.

These and additional objects are accomplished by the various aspects of the present invention, wherein briefly stated, one aspect of the invention is a method implemented in a firewall (e.g., 100) for communicating information between programs employing different protocols (e.g., 16 and 54), comprising communicating information between the programs by protocol translating the information between the different protocols.

In another aspect of the invention, a method implemented in a firewall (e.g., 100) for communicating information between a first program employing a first application level protocol (e.g., 16) in front of the firewall, and a second program employing a persistent application level protocol (e.g., 54) behind the firewall, comprises: establishing a persistent connection with the second program; and communicating information between the first program and the second program by protocol translating the information between the first application level protocol and the persistent application level protocol.

In yet another aspect of the invention, an apparatus in a firewall (e.g., 100) for communicating information between a first program employing a first application level protocol (e.g., 16) in front of the firewall, and a second program employing a persistent application level protocol (e.g., 54) behind the firewall, comprising a bastion host (e.g., 30) having a protocol proxy (e.g., 34) for establishing a persistent connection between the protocol proxy and the second program, and communicating information between the first program and the second program by protocol translating the information between the first application level protocol and the persistent application level protocol.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENT

Figure 1:
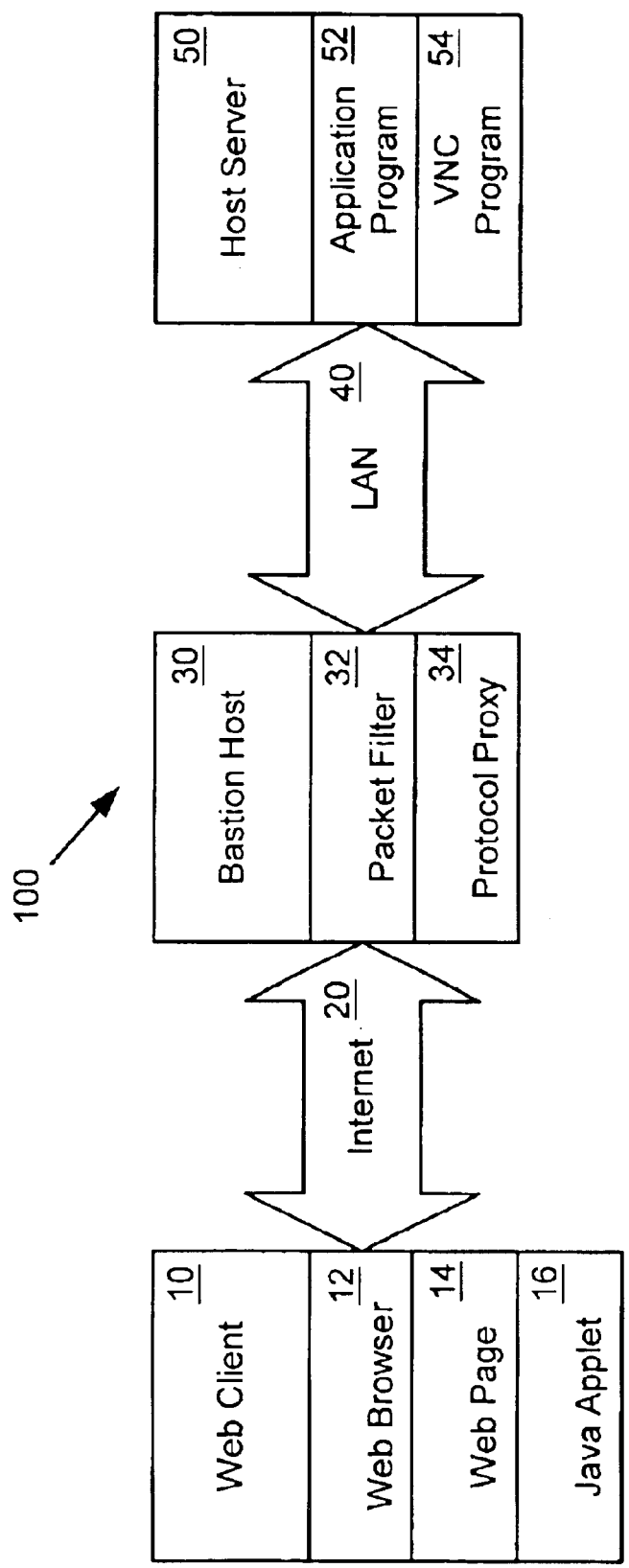
FIG. 1 illustrates a block diagram of a system including an apparatus implemented in a firewall for communicating information between programs employing different protocols.

FIG. 1 illustrates a diagram of a computer system including: a web client 10 having a web browser 12, a web page 14, and a java applet 16 residing on it; a bastion host 30 having a packet filter 32 and a protocol proxy 34 residing on it; and a host or web server 50 having an application program 52 and a special window manager 54 residing on it. All communications between the protocol proxy 34 and the application program 52 go through the special window manager 54. The web client 10 communicates with the bastion host 30 through the Internet 20, and the bastion host 30 communicates with the host server 50 through a LAN 40. The bastion host 30 and the packet filter 32 combine in a conventional manner to form a firewall 100 that protects the host server 50 from hacker attacks launched through the Internet 20. The web page 14 and the java applet 16 had been previously downloaded from the host server 50.

Figure 2:
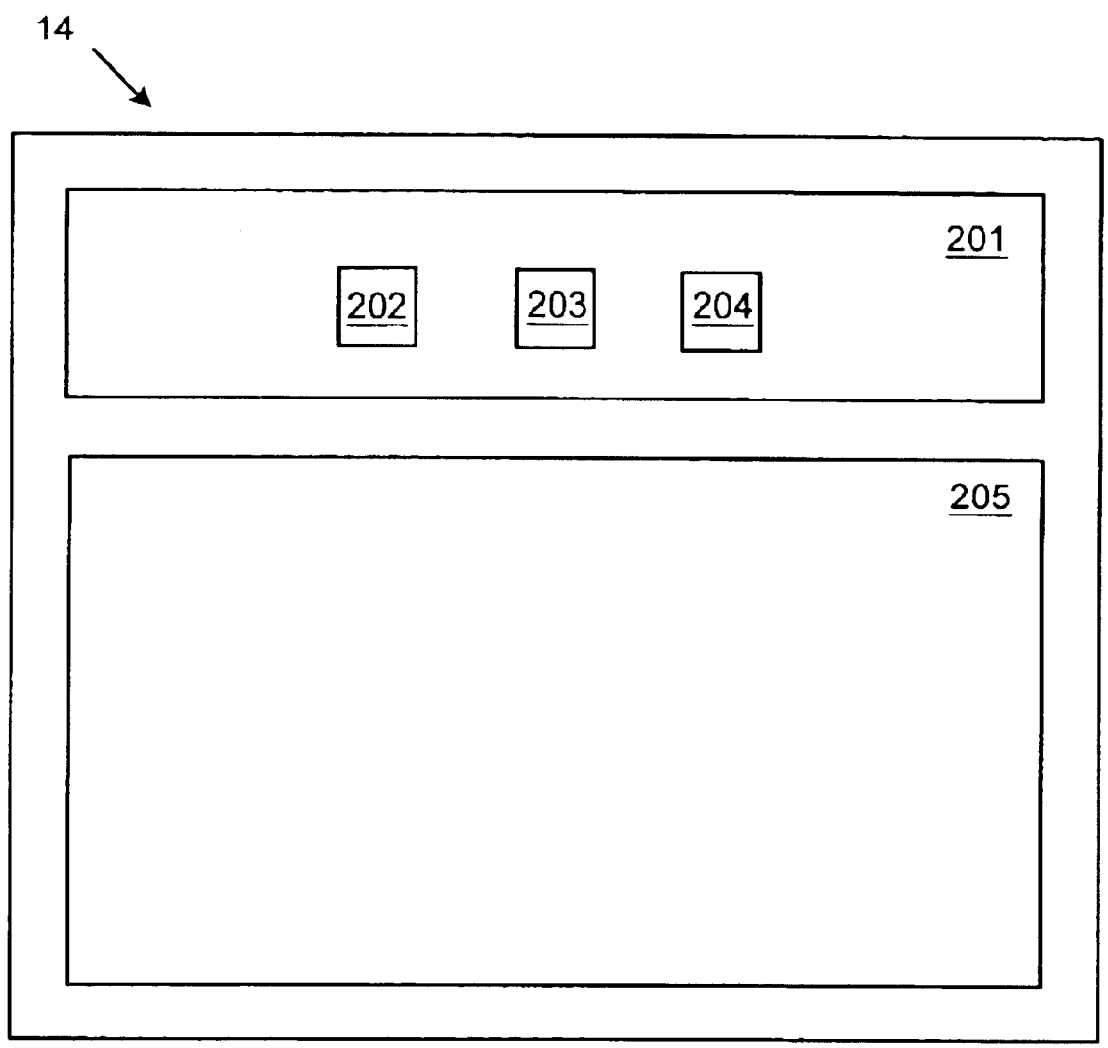
FIG. 2 illustrates a web page displayed on a web client to facilitate a method implemented in a firewall for communicating information between programs employing different protocols.

FIG. 2 illustrates the web page 14 as it appears on a display screen of the web client 10. A menu area 201 is reserved for control buttons such as, for example, buttons 202, 203 and 204, that generate commands through the java applet 16 which control the operation of the application program 52 through the special window manager 54. An image area 205 is reserved for images received from the application program 52 through the special window manager 54. Preferably, the web page 14 resembles the display screen on the host server 50 when running the application program 52, including the location and functions of the control buttons. Although control buttons are used in this example, their use is merely to simplify the description. It is to be appreciated that tool bars with pull-down menus are more commonly used in practice and fully contemplated within the scope of the present invention.

The application program 52 is a real-time interactive program employing a corresponding socket-based protocol. The special window manager 54 is preferably VNC (virtual network computing) from AT&T employing the RFB (remote frame buffer) protocol. Both protocols require a persistent connection. As will be described in reference to FIG. 3, the protocol proxy 34 translates information to be communicated from the java applet 16 to the application program 52 through the VNC program 54 from HTTP to the RFB protocol. Conversely, the protocol proxy 34 translates return information from the application program 52 through the VNC program 54 to the java applet 16 from the RFB protocol to HTTP.

Figure 3:
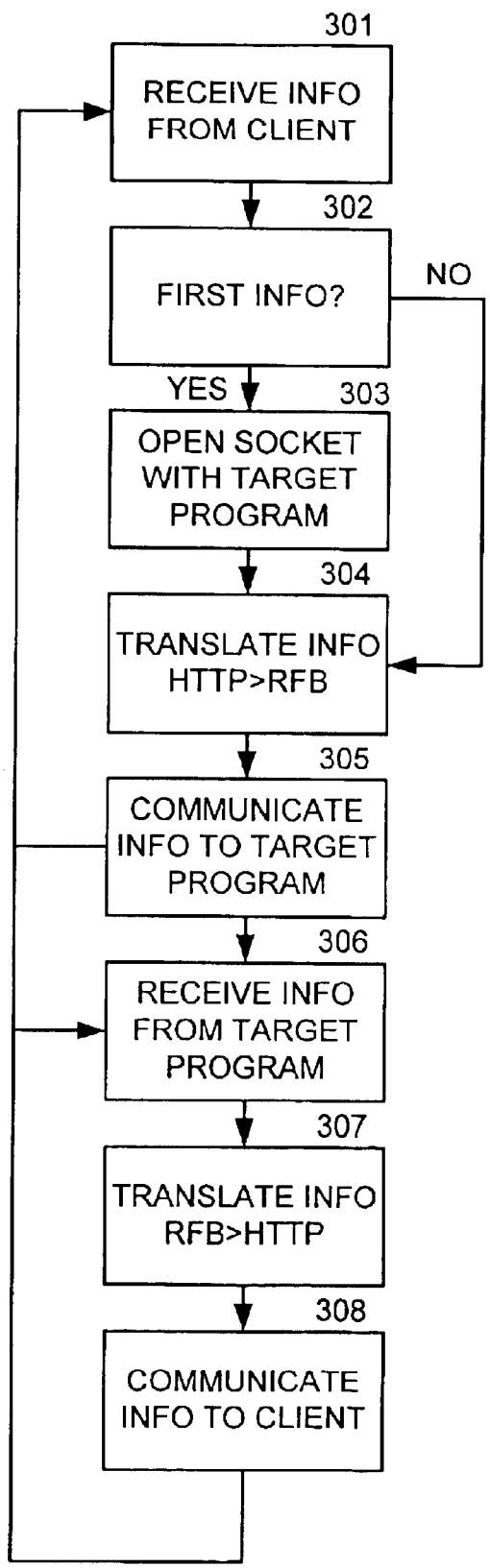
FIG. 3 illustrates a flow diagram of a method implemented in a firewall for communicating information between programs employing different protocols.

FIG. 3 illustrates a flow diagram of a method implemented in the firewall 100 for communicating information between programs employing different protocols. Protocol proxy 34 primarily performs the method. In 301, the protocol proxy 34 receives information from the client server 10 after the information has successfully passed through the packet filter 32. The information may be in the form of a command or a request for information from the java applet 16 to the application program 52 through the VNC program 54. In order to be routed properly, the information is addressed to the protocol proxy 34 with final destination of the VNC program 54 designated in the header. The destination or target program is designated by the java applet 16 when the web client user clicks on a button in the menu area 201 of the web page 14.

In 302, the protocol proxy 34 reads the final destination of the information (i.e., the target program) and determines whether the received information is the first information to be communicated to that destination in the current session. The determination is straightforward. If there is no socket currently open with the destination, then the received information is assumed to be the first information to be communicated to that destination in the current session, and the answer is yes. On the other hand, if there is an open socket currently open with the destination, then the received information is assumed not to be the first information to be communicated to that destination in the current session, and the answer is no.

Now, if the answer in 302 is yes, then in 303, the protocol proxy 34 first opens a socket with the target program (i.e., the VNC program 54). In 304, the protocol proxy 34 translates the information from HTTP to the RFB protocol. As used herein, protocol translation means any or all of providing the proper handshaking, format (e.g., headers, command, data, and error correction code), and command or data translation, as appropriate. Also, both the application program's persistent connection, socket-based protocol and the VNC program's RFB protocol are referred to herein as persistent application level protocols.

In 305, the protocol proxy 34 communicates the protocol translated information to the destination or target program. The proxy protocol 34 may then loop back to 301 to receive another information from the java applet 16, or proceed to 306. In 306, the protocol proxy 34 receives a response from the target program, and in 307, the protocol proxy 34 then translates the information from the RFB protocol to HTTP. In 308, the protocol proxy 34 then communicates the protocol translated information to the java applet 16. The protocol proxy 34 may then loop back to 301 if it receives an information packet from the java applet 16, or loop back to 306 if it receives an information packet from the application program 52 through the VNC program 54.

On the other hand, if the answer in 302 is no, then the protocol proxy 34 skips 303 and performs 304–308 as previously described. After the web client user terminates his or her session, the java applet 16 sends a termination indication to the protocol proxy 34, and the protocol proxy 34 closes the open socket with the VNC program 54. Thus, by maintaining the socket open in this fashion with the VNC program 54 until told to quit or terminate, a persistent connection is established and maintained with the program.

Although the various aspects of the present invention have been described with respect to a preferred embodiment, it will be understood that the invention is entitled to full protection within the full scope of the appended claims.

We claim:

1. A method implemented in a firewall for communicating information between programs employing different protocols, wherein one of the programs is in front of the firewall employing a stateless application level protocol and another of the programs is behind the firewall employing a persistent application level protocol, comprising: communicating information between the programs by protocol translating the information between the different protocols; and establishing a persistent connection with the program behind the firewall before communicating information between the programs.

2. The method according to claim 1, further comprising communicating with the program in front of the firewall over the Internet, and communicating with the program behind the firewall over a local area network.

3. The method according to claim 2, wherein the program in front of the firewall resides on a client server.

4. The method according to claim 2, wherein the program behind the firewall resides on a web server protected by the firewall.

5. A method implemented in a firewall for communicating information between a first program employing a first application level protocol in front of the firewall, and a second program employing a persistent application level protocol behind the firewall, comprising:

establishing a persistent connection with the second program; and communicating information between the first program and the second program by protocol translating the information between the first application level protocol and the persistent application level protocol.

6. The method according to claim 5, wherein the first application level protocol is a stateless application level protocol.

7. The method according to claim 6, wherein the stateless application level protocol is hypertext transfer protocol.

8. The method according to claim 5, wherein the persistent application level protocol is remote frame buffer protocol.

9. The method according to claim 5, wherein the establishing a persistent connection comprises opening a socket with the second program, and maintaining the socket open until communication between the first program and the second program terminates.

10. The method according to claim 5, further comprising receiving a request for information over the Internet from the first program directed to the second program, before establishing the persistent connection with the second program.

11. The method according to claim 5, further comprising receiving a request for information from the second program directed to the first program, after establishing the persistent connection with the second program.

12. An apparatus in a firewall for communicating information between a first program employing a first application level protocol in front of the firewall, and a second program employing a persistent application level protocol behind the firewall, comprising a bastion host having a protocol proxy for establishing a persistent connection between the protocol proxy and the second program, and communicating information between the first program and the second program by protocol translating the information between the first application level protocol and the persistent application level protocol.

13. The apparatus according to claim 12, wherein the first application level protocol is a stateless application level protocol.

14. The apparatus according to claim 13, wherein the stateless application level protocol is hypertext transfer protocol.

15. The apparatus according to claim 12, wherein the persistent application level protocol is remote frame buffer protocol.

16. The apparatus according to claim 12, wherein the establishing a persistent connection comprises opening a socket with the second program, and maintaining the socket open until communication between the first program and the second program terminates.

17. The apparatus according to claim 12, wherein said bastion host further includes a packet filter, and said protocol proxy is further for cooperating with the packet filter to receive a request for information over the Internet from the first program directed to the second program, before establishing the persistent connection with the second program.

18. The apparatus according to claim 12, wherein said protocol proxy is further for receiving a request for information from the second program directed to the first program, after establishing the persistent connection with the second program.

* * * * *